(No Model.) 2 Sheets—Sheet 1.
B. D. MAGUIN.
APPARATUS FOR THE MANUFACTURE OF AMMONIA SODA.
No. 308,083. Patented Nov. 18, 1884.
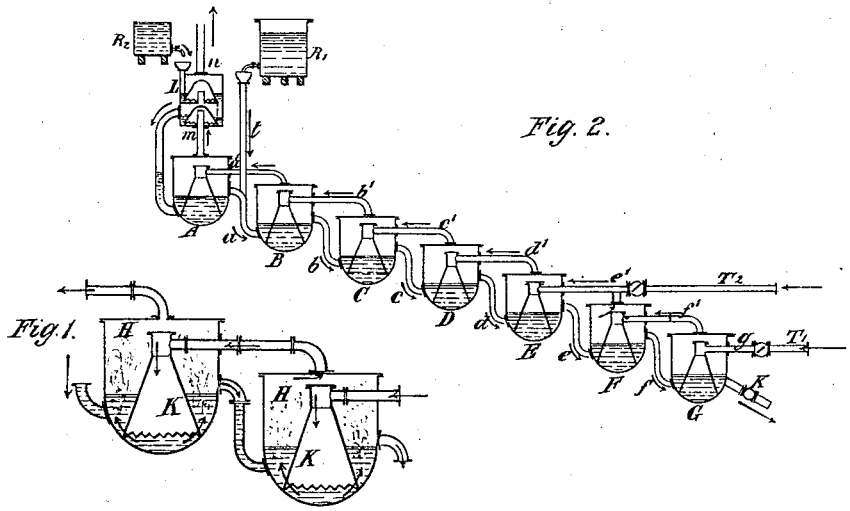
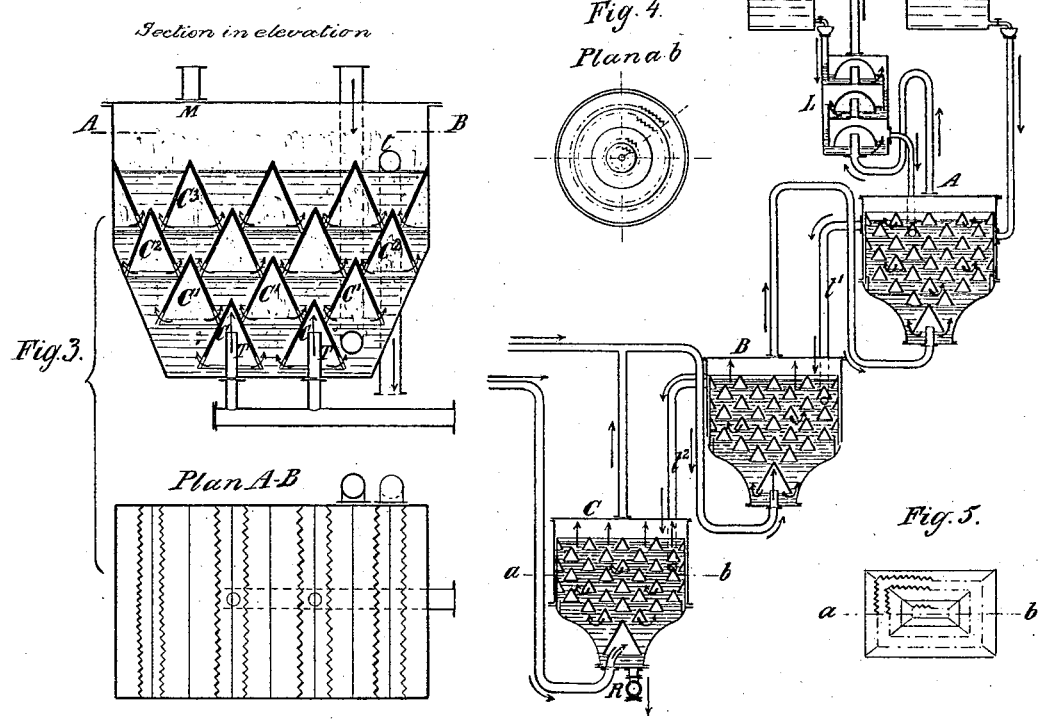

(No Model.)
2 Sheets—Sheet 2.
B. D. MAGUIN.
APPARATUS FOR THE MANUFACTURE OF AMMONIA SODA.
No. 308,083. Patented Nov. 18, 1884.
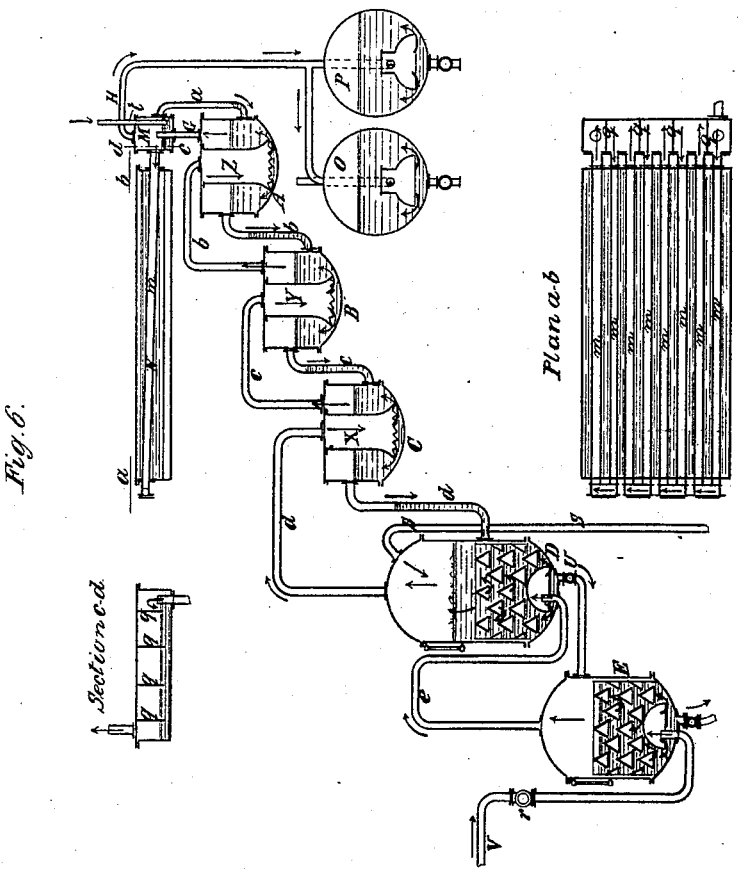

UNITED STATES PATENT OFFICE.

BENJAMIN DIDIER MAGUIN, OF NANCY, FRANCE.

APPARATUS FOR THE MANUFACTURE OF AMMONIA SODA.

SPECIFICATION forming part of Letters Patent No. 308,083, dated November 18, 1884.

Application filed January 7, 1884. (No model.)

*To all whom it may concern:*

Be it known that I, BENJAMIN DIDIER MAGUIN, of the city of Nancy, France, have invented new and useful Improvements in Apparatus for Manufacture of Soda by the Ammonia Process, of which the following is a full, clear, and exact description.

This invention relates to an improved apparatus for the manufacture of soda by means of ammonia.

It is well known that when a solution of chloride of sodium is treated with bicarbonate of ammonia, bicarbonate of soda is precipitated, the hydrochlorate of ammonia replacing the chloride of sodium of the solution. It is also known that the same chemical reaction may be produced under special conditions by bicarbonating the ammonia in the saline solution itself by means of carbonic acid in a pure or impure condition obtained from any suitable source. The precipitate of bicarbonate of soda is separated from the liquid by any suitable means, and when subjected to a certain temperature in calcining apparatus it gives off a portion of the carbonic-acid gas and becomes transformed into neutral carbonate of soda. The liquid, which chiefly contains hydrochlorate of ammonia, is caused to give up the ammonia it contains by treatment with lime or other fixed alkali in special apparatus for use again in the ammoniacal brine. The practical application of this simple method presents two great difficulties, which are due, first, to the slowness of the reaction between the carbonic acid and the ammonia in the brine (especially toward the end of the operation) for precipitating the bicarbonate of soda; second, to the great waste of ammonia, both in the apparatus in which the reaction takes place and in those used for the recovery of the ammonia and the preparation of the brine, which objections can only be completely avoided by the employment of apparatus arranged on a methodical plan, and especially adapted, both in detail and general arrangement, to suit the end in view.

The novel means which constitutes the principle and essential feature of this invention, and which is embodied in the apparatus hereinafter described, realizes admirably and in a highly economical manner the condition of a double intimate contact, and consequently of a very simple, rapid, and energetic reaction, as will be hereinafter explained. Moreover, it realizes the other special advantage of great practical interest. If a current of carbonic acid, whether pure or impure, be caused to traverse at a sufficiently high and uniform velocity an ammoniacal brine contained in a receiver of suitable capacity, but not completely filled, two absolutely distinct phases of the reaction will occur—first, absorption of the gas by its passage through the liquid; second, further absorption by the violent projection of the liquid into the gas at the upper part of the chamber, such projection being caused by the velocity with which the gas escapes from the liquid. In short, the aim of the invention is to utilize the velocity of the gas escaping from the liquid by causing it to project the liquid violently into the gaseous medium above it, and thus cause a further absorption or reaction by this second intimate contact. This method of proceeding presents an enormous advantage, inasmuch as the useful effect is doubled without any increase in the cost of working.

It will be readily understood that this principle may be carried out in practice in many different ways; and I will here only describe three methods which appear to be most advantageous, reference being had to the accompanying drawings, which illustrate an example of the apparatus employed.

The apparatus represented in Figures 1 and 2 consists of a series of receivers, A B C D E F G, whose form and dimensions may vary. The ammoniacal brine to be treated is maintained at a constant level in a reservoir, R', and is supplied thence to the apparatus by a pipe, $t$, and passes downward in a continual stream through the vessels C D E, &c., in succession by means of the overflow-pipes $b\ c\ d$, &c., until it reaches the last vessel, G, in which the reaction is terminated, and from which the liquid may be drawn off from time to time by means of a cock, K. Salt-water is supplied to the upper vessel, A, from a washer, L, which is fed from a reservoir, $R^2$, in which a constant level is maintained. This salt-water serves to deprive the inert gases of the ammonia carried along therewith out of the apparatus. This water mixes in B with the ammoniacal brine from R', the supply of the water being so regulated that its strength in ammonia shall be suitable for the mixture entering the reaction apparatus proper. The carbonic-acid gas, which is introduced at a uniform and sufficiently high velocity, circulates in each of the vessels, and escapes thence through the washer L and into the atmosphere by pipe r. The pure carbonic acid direct from the calcining apparatus is introduced at T', and the impure carbonic acid supplied from any suitable source enters at $T^2$, where it is mixed with the excess of pure acid escaping from F. In each of the vessels the gas first enters a bell, K, open at bottom and deeply notched around its edge, as shown in Fig. 1. The gas, by reason of its pressure and velocity, drives out and traverses the liquid, (first absorption and reaction,) and projects it violently into the gas-space in the outer vessel, H, (second absorption and reaction,) whence the gas passes into the next vessel, where the action is repeated, and so on.

Fig. 3 represents a modified arrangement of the apparatus.

In addition to the great advantages of the double reaction which is completely realized in this apparatus, the simplicity of its construction and working, the absence of all machinery, the circulation in inverse directions of the gases and liquids, the division of the treatment by the pure and impure carbonic acid, and the facilities for cleaning, form practical improvements of considerable value.

In order to diminish the number of vessels as well as the expense of maintenance and first cost, it has been sought to increase to a very great extent the useful effect by multiplying in each vessel the passages of the gas through the liquid, the gas-spaces, and the projection of the liquid into the gas-spaces.

The apparatus represented in section and plan in Fig. 3 is a closed chamber, to the sides of which are fixed gas-pockets of inverted U, V, or other form, notched at their lower edges and disposed relatively to each other as shown. The carbonic-acid gas arriving under pressure and at a suitable velocity by pipes T escapes under the notched edges of chambers C C, and passes through the liquid h h, (first absorption and reaction,) and on entering the gas-spaces of said chambers by reason of its *vis viva* it projects the liquid violently into said spaces, (second absorption and reaction,) and so on for each row until it reaches the top of the vessel, where it escapes by pipe M, the series of vessels being arranged as shown in Fig. 1, and furnished with overflow-pipes t, for the passage of the liquid from each vessel to the next below. This multiplicity of contacts and successive projections allows of a large amount of useful effect being obtained in an apparatus of small dimensions, and for this reason it is preferred to the former arrangement. The apparatus represented in Figs. 4 and 5 is designed on the same principle, but possesses a certain superiority both as regards its general arrangement and details. The number of vessels is reduced to three.

Pure carbonic acid is supplied to the lowest one, C, to complete the reaction commenced in the other two vessels, B A, by impure carbonic acid and the excess pure carbonic acid coming from C. The ammoniacal brine from reservoir R' mixes with the salt-water from washer L, fed by the reservoir $R^2$, so as to insure a proper proportion of ammonia, as before explained. The liquids, which are supplied continuously, pass from A to B and from B to C by the overflow-pipes t' $t^2$, the liquid collecting in C being drawn off from time to time by cock R when the reaction is completed. The operation is rendered very methodical by the circulation of the gases and liquids in opposite directions, and the apparatus being very simple insures regularity of working. The gas-chambers in each vessel of the series are arranged in the most advantageous manner as regards their construction, arrangement, and cleaning, while the same double reaction takes place as in the apparatus shown in Fig. 3. The gas-chambers are annular inverted troughs of ∧ or ∩ form, simply piled upon one another without needing any adjustment, their edges being notched all around to allow of the gas escaping, the action being the same as in Fig. 3. These chambers may also be made of rectangular pyramidal form, as in Fig. 5. The vessel to contain a number of these chambers would be rectangular instead of cylindrical, as before.

The invention thus consists more particularly in the principle of the double action of the gas upon the liquid by displacement and projection with the aid of suitable gas-chambers, and more particularly those hereinbefore described.

In the regeneration of the ammonia it is of advantage to perform the operation in two distinct stages on account of the composition of the clear liquids after the bicarbonate of soda has been separated. These clear liquids in fact contain ammonia in two different conditions—viz., carbonate of ammonia and hydrochlorate of ammonia. Moreover, a certain quantity of bicarbonate of soda is held in solution in the liquid, and when the operation is effected under certain conditions the bicarbonate of soda reacting on the hydrochlorate of ammonia may cause carbonate of ammonia to disengage. It is of advantage to collect the whole of this carbonic acid at the same time as the ammonia. For this purpose the apparatus represented in Fig. 6 is used. This apparatus is based on the same principle as the other, and although continuous in its action separates the operation into two phases and realizes all the conditions of a methodical working. The apparatus is heated by steam supplied by pipe V and regulated by cock r, and it comprises three distillatory chambers, A B C, in which the whole of the ammonia is driven off together with the carbonic acid, two other chambers, D E, in which the reaction between the hydrochlorate of ammonia and the lime takes plates for disengaging caustic ammonia, a condenser separator, N, with collector M, and two reservoirs, O P, containing the brine in which the ammonia and carbonic acid are condensed. The clear liquid is continuously supplied to the apparatus by the pipe $t$, which is fed from a reservoir wherein a constant level is maintained, and dips in the liquid contained in the collector M, for a purpose hereinafter described. Thence the liquid passes into the distilling-chamber A by the overflow-pipe $a$, and so on to chambers B and C by the pipes $b$ and $c$, respectively. The liquid on leaving the latter chamber no longer contains carbonic acid combined with ammonia, so that the liquid flowing through pipe $d$ into chamber D contains ammonia only in the form of hydrochlorate. Milk of lime of the proper strength is constantly pumped through pipe S into chamber D, and reacting on the liquid therein produces a brisk disengagement of caustic ammonia. When the liquid, which is continuously supplied to the chamber D, has attained a certain level, a portion is drawn off by cock U, after having previously drawn off from chamber E a corresponding quantity of the liquid contained therein, which has become completely deprived of ammonia during the filling of D. The lower part of chambers D E contain the inverted trough or bell chambers having notched edges, as before described, for the purpose of facilitating the liberation of the ammonia. The steam entering by pipe V into chamber E drives off the last traces of ammonia contained in the liquid, and the mixture of ammonia and steam passes by pipe $e$ into D, where it drives off a fresh quantity of ammonia, the mixture escaping by pipe $d$ being richer in ammonia and less so in steam. This mixture enters chamber X and traverses the liquid in C, becoming further charged with ammonia, and also with carbonic acid, and so on until it reaches G, whence the mixture, which is now very rich in ammonia and carbonic acid, passes through the collector M to the condenser-tubes $m$, which are immersed in a continuously-circulating current of cold water. The greater part of the steam there condenses, and the liquid being charged with a certain quantity of ammonia is allowed to flow back to the collector, (the pipes $m\ m$ being inclined,) whence it is returned to the distillatory apparatus by the overflow-pipe $a$, while the mixture of ammonia and carbonic acid, now but slightly charged with steam, is conveyed by the pipe H to the brine-reservoirs O P. The collector M is provided with means for forcing the gases to traverse the whole series of condenser-tubes $m\ m$ in succession, and also for at same time collecting the liquids charged with ammonia flowing therefrom. This arrangement consists of diaphragms $q\ q\ q$, which are partially immersed in the liquid and insure the circulation of the gases, while at the same time allowing of the liquid passing out at overflow-pipe $a$.

I claim—

The combination of the pipe V with the vessels E D C B A, separator N, collector M, and reservoirs O P, substantially as herein shown and described.

The foregoing specification of my improvements in the manufacture of soda by the ammonia process signed by me this 16th day of November, 1883.

BENJAMIN DIDIER MAGUIN.

Witnesses:
ROBT. M. HOOPER,
JEAN BAPTISTE ROLLAND.